US009967352B2

United States Patent
Hinnegan et al.

(10) Patent No.: US 9,967,352 B2
(45) Date of Patent: May 8, 2018

(54) COMMUNICATION SYSTEM WITH LOCATION BASED SERVICES MECHANISM AND METHOD OF OPERATION THEREOF

(71) Applicant: Telenav, Inc., Sunnyvale, CA (US)

(72) Inventors: John Hinnegan, Santa Monica, CA (US); Lucas Dickey, Los Angeles, CA (US); Eli Portnoy, Los Angeles, CA (US)

(73) Assignee: Telenav, Inc., Santa Clara, CA (US)

( * ) Notice: Subject to any disclaimer, the term of this patent is extended or adjusted under 35 U.S.C. 154(b) by 377 days.

(21) Appl. No.: 14/156,100

(22) Filed: Jan. 15, 2014

(65) Prior Publication Data

US 2015/0201028 A1 Jul. 16, 2015

(51) Int. Cl.
*G06F 15/16* (2006.01)
*H04L 29/08* (2006.01)
*G06Q 30/02* (2012.01)

(52) U.S. Cl.
CPC .............. *H04L 67/18* (2013.01); *G06Q 30/02* (2013.01); *H04L 67/30* (2013.01); *H04L 67/306* (2013.01)

(58) Field of Classification Search
CPC ................................ H04L 67/18; H04L 67/30
USPC .......................................................... 709/217
See application file for complete search history.

(56) References Cited

U.S. PATENT DOCUMENTS

| 6,574,660 | B1 | 6/2003 | Pashupathy et al. |
| 6,819,919 | B1 | 11/2004 | Tanaka |
| 8,108,245 | B1 * | 1/2012 | Hosea ..................... G06Q 30/02 705/14.49 |
| 8,316,406 | B2 | 11/2012 | Lin et al. |
| 8,874,474 | B2 * | 10/2014 | Wakai ................ H04N 21/6371 705/26.1 |
| 2009/0048977 | A1 * | 2/2009 | Aggarwal ......... G06F 17/30867 705/50 |
| 2009/0098894 | A1 | 4/2009 | Dudley et al. |
| 2011/0260860 | A1 * | 10/2011 | Gupta .................... G06Q 30/02 340/539.13 |
| 2014/0278860 | A1 * | 9/2014 | Lee .................... G06Q 30/0214 705/14.16 |

OTHER PUBLICATIONS

Viana et al; "Towards the Semantic and Context-Aware Management of Mobile Multimedia"; Mar. 24, 2010; Springer Science Business Media; pp. 391-429.*

* cited by examiner

*Primary Examiner* — Glenford Madamba
(74) *Attorney, Agent, or Firm* — Perspectives Law Group

(57) ABSTRACT

A method of operation of a communication system includes: determining a unique identification; identifying a category from the unique identification; determining a refined category by analyzing an effectiveness of delivered content for the category; and parsing a relevant information based on the refined category for presenting an alert flag on a device upon arrival of the delivered content.

20 Claims, 5 Drawing Sheets

COMMUNICATION SYSTEM WITH LOCATION BASED SERVICES MECHANISM AND METHOD OF OPERATION THEREOF

TECHNICAL FIELD

The present invention relates generally to a communication system, and more particularly to a system with location based services mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Communication systems and location based services enabled systems have been incorporated in automobiles, notebooks, handheld devices, and other portable products. Today, these systems aid users by incorporating available, real-time information, such as maps, directions, local businesses, or other points of interest (POI), coupons, retail offers or the like. The real-time information provides invaluable relevant information.

However, a communication system without a location based services mechanism to adjust the location based coupons, directions, or information of interest according to the circumstance has become a paramount concern for the consumer. This inability decreases the benefit of using the tool and can become a bother if incorrect content is delivered to the tool.

Thus, a need still remains for a communication system with location based services mechanism to adjust the location based coupons, directions, or information of interest according to the circumstance. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a communication system including: determining a user profile based on a route history for providing a delivered content; generating a category from the user profile; determining a refined category by analyzing an effectiveness of the delivered content for the category; and parsing a relevant information based on the refined category for presenting an alert flag on a device upon arrival of the delivered content.

The present invention provides a communication system, including: a control unit for executing a build user profile module to determine a unique identification; a storage unit, coupled to the control unit, for executing an identify categories module to identify a category from the unique identification; a communication interface, coupled to the control unit, to receive delivered content and execute an update categories module for determining a refined category by analyzing an effectiveness of the delivered content for the category; and a display screen, coupled to the control unit, for presenting an alert flag on a device upon arrival of the delivered content includes an analyze available content module for parsing a relevant information based on the refined category.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
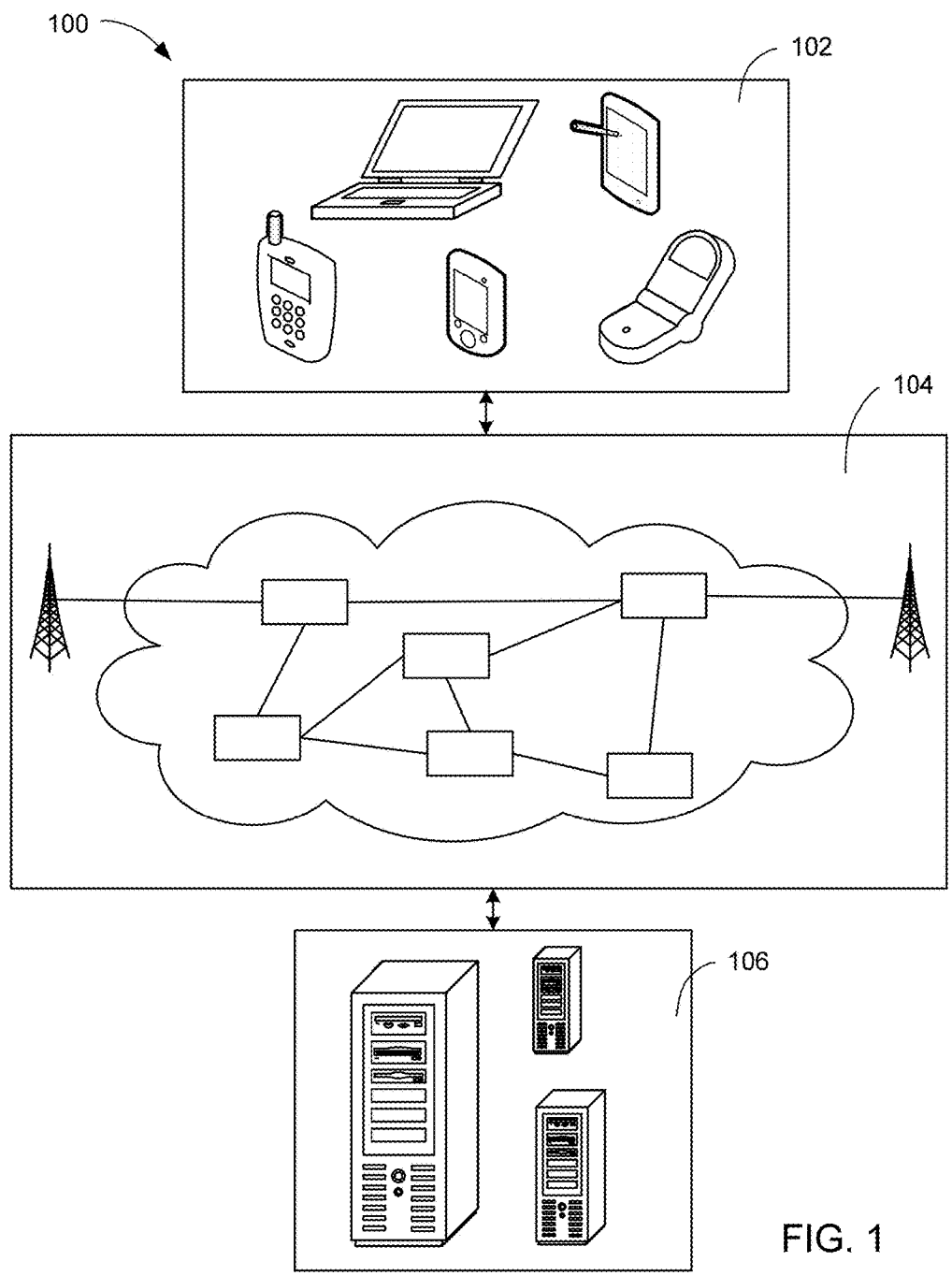
FIG. 1 is a communication system with location based services mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the communication system 100 are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a communication system 100 with location based services mechanism in an embodiment of the present invention. The communication system 100 includes a first device 102, such as a client or a server, connected to a second device 106, such as a client or server, with a communication path 104, such as a wireless or wired network.

For example, the first device 102 can be of any of a variety of mobile devices, such as a cellular phone, a smart phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the communication system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the communication system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the communication system 100 is shown with the second device 106 and the first device 102 as end points of the communication path 104, although it is understood that the communication system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
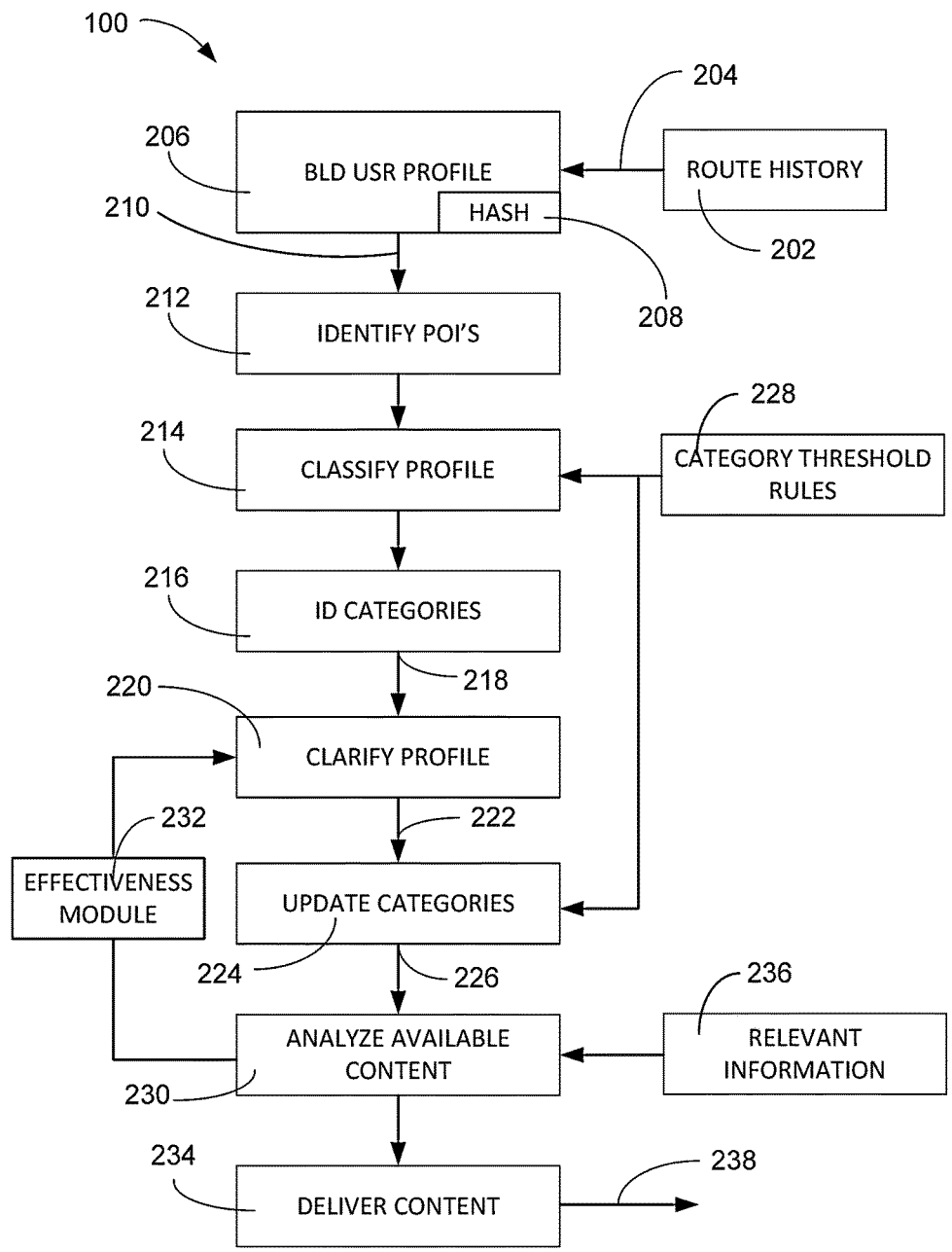
FIG. 2 is an operational control flow of the communication system of FIG. 1.

Referring now to FIG. 2, there is shown an operational control flow 202 of the communication system 100 of FIG. 1. For clarity and brevity, the discussion of the embodiment of the present invention will focus on the first device 102 of FIG. 1 delivering the result generated by the communication system 100. However, the second device 106 of FIG. 1 and the first device 102 can be discussed interchangeably.

The first device 102 can convey its location to the second device 106 for constructing a route history 202, such as a profile of its travels. The route history 202 can include personal information 204, such as home addresses, work address, private data, or the like. A build user profile module 206 can analyze the route history 202 to compile the movements of the first device 102 over an extended period of time. The build user profile module 206 can compile a list of business locations that were visited by the first device 102. The locations can be stored in an X, Y format representing the latitude and longitude of the locations visited. The build user profile module 206 can also store the date, time, and duration of the visit to the location.

The build user profile module 206 can remove any of the personal information 204 by applying a one-way transform 208, such as a hashing algorithm to remove any way of identifying the personal information 204. It is understood that the one-way transform 208 can reduce the personal information 204 to a smaller data in a fashion that cannot be reversed. A unique identification 210, such as a user profile, can be applied to the route history 202 visited by the first device 102. The unique identification 210 cannot be used to identify any of the personal information 204 about the user of the first device 102, while still providing the unique identification 210 for location based services.

An identify points of interest module 212 matches the output of the build user profile module 206 to a database containing points of interest that are found at the locations visited by the first device 102. The identify points of interest module 212 uses detailed location information for cross-referencing the database and accurately identifying the points of interest. The detailed location information can come from a global positioning system, cellular triangulation, WiFi access, public network access, home network access, personal area network access, or the like. By way of an example, the identify points of interest module 212 can use multiple location identifiers to identify the specific point of interest visited by the first device 102. The identify points of interest module 212 can utilize multiple location information sources to identify specific locations of the points of interest visited by the first device 102. The identify points of interest module 212 can capture the points of interest, date visited and the duration of the visit for further analysis.

A classify profile module 214 sorts the points of interest that were visited by the first device 102 in order to classify the user of the first device 102 by interests, habits, or a combination thereof. The user of the first device 102 can be classified in more than one category. By way of an example, the output of the identify points of interest module 212 can indicate that a daily visit to a coffee shop for a duration of five to ten minutes can indicate the user of the first device 102 is a coffee drinker, while an hour long visit to the coffee shop could indicate the user of the first device 102 is using the WiFi to check e-mail or some other form of social communication. The user of the first device 102 can also visit a store or a gas station on a regular basis indicating their preference for that brand or organization.

An identify categories module 216 sorts the output of the classify profile module 214 in order to identify categories 218 that reflect the interests and habits of the user of the first device 102. The identify categories module 216 sorts the points of interests into related groups, such as coffee shops, retail stores, bars and restaurants, sports venues, concert venues, movie theaters, gas stations, automobile service locations, etc. The identify categories module 216 also establishes a parametric view of the categories 218, such as the frequency of the visits to the points of interest, the duration of the visits, and any related points of interest visited in sequence. Each of the categories can have threshold rules 228 for a frequency of use and an extended period of time that must be met in order to include the user of the first device 102 as a member of the categories 218. This process can differentiate between a coffee drinker and a WiFi user based on the duration of the visits at an establishment. In some cases the user of the first device 102 can be categorized as both a coffee drinker and a WiFi user. A weekly visit to the store can also categorize the user of the first device 102 as a grocery shopper, health food shopper, clothing shopper, furniture shopper, shoe shopper, cosmetic shopper, or a combination thereof. The classify profile module 214 applies the threshold rules 228, based on the number of visits to a point of interest and their duration over the extended period of time, for categorizing the user of the first device 102.

By way of an example, one of the categories 218, such as "movie goer", can have the threshold rules 228 of attending a movie theatre one time in a month and require the extended period of time to be six months of samples before the user of the first device 102 is put in that category 218. In contrast, the category 218 "frequent shopper" can have the threshold rules 228 of going to a retail store twice per week and require the extended period to be only two months of samples before the user of the first device 102 is put in that category 218.

It is understood that the number and detail of the categories 218 can be a variable based on the type of relevant information 236 that is available for location based services to the user of the first device 102. The relevant information 236 can include navigation information as well as information relating to points of interest to the user of the first device 102, such as local business, hours of businesses, advertised specials, coupons, restaurant suggestions, event notifications, traffic information, maps, local event reminders, nearby community information of personal interest, or a combination thereof. In general the category 218, such as the movie goer or the frequent shopper, can be applied to the user of the first device 102 in order to allow further refinement of the category 218 and a better understanding of the interests and habits demonstrated by the user of the first device 102.

A clarify profile module 220 analyzes more detailed trends in the behavior of the user of the first device 102. The clarify profile module 220 searches the categories 218 for patterns and details more specific to the general categories. By way of an example, the user of the first device 102 can be listed as a coffee drinker and the clarify profile module 220 determines that the brand of choice is Pete's Coffee™ because the user of the first device 102 visits the same coffee shop every day during the work week. The clarify profile module 220 will annotate the category to indicate a preference for Pete's Coffee. By way of a further example, the clarify profile module 220 can determine that the user of the first device 102 has visited a restaurant on Friday evening for several months and that most of the visits are to the same restaurant. The clarify profile module 220 can determine that the user of the first device 102 has a preference for the type of food served at that restaurant, but may be open to trying other establishments. The behavior can fit multiple categories, such as restaurant user, Friday night shopper, lover of specific food type, or a combination thereof. The clarify profile module 220 can also analyze an effectiveness 222 of the relevant information 236 that was previously sent to the user of the first device 102.

The effectiveness 222 of a delivered content 238 can be measured by determining whether the user of the first device 102 actually travels to a location specified by the delivered content 238. The effectiveness 222 can be enhanced by calculating the probability that the user of the first device 102 will accept the offers and suggestions of the delivered content 238 based on the categories 218 that can apply to the user of the first device 102 and the unique identification 210.

An update categories module 224 analyzes the output of the clarify profile module 220 in order to refine and narrow the categories 218 that can apply to the user of the first device 102. The annotation added by the clarify profile module 220 can trigger the update categories module 224 to update the categories 218. This update of the categories 218 to more closely align with the habits and interests of the user of the first device 102 can more than double the effectiveness 222 of the relevant information 236 that can be delivered as content, such as advertising, coupons, sale items, directions, or the like. The effectiveness 222 of the relevant information 236 can be determined if the user of the first device 102 goes to the advertised locations. The update categories module 224 can determine the type as well as the timing for delivery of the relevant information.

The update categories module 224 also applies the threshold rules 228 related to the designation of the category 218, which can be extended to a refined categories 226. By applying the threshold rules 228 to the category 218 and the annotation applied by the clarify profile module 220 to "coffee drinkers", the user of the first device 102 can be categorized as a "Pete's Coffee drinker" who frequents Pete's coffee shops by visiting at least 3×/week. Another of the category 218 of "movie goer" can have the threshold rules 228 for the category 218 to be 1×/month. The threshold rules 228 can be interpreted by the update categories module 224 for the refined categories 226 as well.

By way of an example, if the user of the first device 102 goes to a specific Italian restaurant every Friday night, coupons for different Italian restaurant delivered on Thursday can offer a venue that has appeal to the interests of the user of the first device 102 while allowing time for plans to be made to go there. If the user of the first device 102 selects a different restaurant every Friday evening, they can be open to other types of restaurants and can be attracted with discounts or sale information.

Some of the relevant information 236 can combine two or more of the refined categories 226 as determined by the update categories module 224. By way of an example, if the user of the first device 102 is a sports fan that eats mostly Mexican food, a coupon for a Mexican restaurant adjacent to the sports venue that is available on the day of a sporting event can be very effective. The timing for delivery of the relevant information 236 can be coordinated with the sporting events at the selected sports venue. The update categories module 224 can reference the locations attended and the dates to determine what sport, team, or participant is of interest to the user of the first device 102.

The update categories module 224 determines refined categories 226 that can be assigned to the user of the first device 102 by detecting that the user of the first device 102 has a preference for a specific brand or establishment based on the points of interest in the route history 202. The user of the first device 102 can be in the category 218 of a "frequent shopper" but the update categories module 224 can sort the points of interest visited by the first device 102 in order to determine that the retail outlet of choice is WalMart™ so the category 218 can be narrowed to be the refined categories 226 of "WalMart™ shopper". In this fashion the relevant information 236 targeted for the user of the first device 102 can have benefit for both the retail outlet and the user of the first device 102. By monitoring the actions of the first device 102 it has been determined that the effectiveness 222 of the delivered content of the relevant information 236, using the refined category 226, can be doubled over the use of the categories 218 previously used.

An analyze available content module 230 coordinates the relevant information 236 that applies to the user of the first device 102. Any of the relevant information 236 that applies to the user of the first device 102 can be queued for a deliver content module 234. The analyze available content module 230 can alert the clarify profile module 220 to the delivery of the relevant information 236 through an effectiveness module 232 for monitoring the response to delivered content 238. The effectiveness module 232 can provide a built-in feedback mechanism for the relevant information 236 that can refine the type and timing of the delivered content 238 of the relevant information 236 to increase the effectiveness 222 and usefulness of the delivered content 238 to the user of the first device 102.

Certain types of advertised specials can be auctioned for distribution to members of a specific category. The second device 106 of FIG. 1 can broadcast the advertised specials available to members of a specific category, such as Saints™ football fans, Starbucks™ coffee drinkers, Walmart™ shoppers, that are available to a limited number of respondents. The analyze available content module 230 can examine the auctioned material to determine whether the user of the first device 102 is a member of the category targeted by the auction. If there is a match, the analyze available content module 230 will respond to the second device 106 to request the advertised specials provided by the auction. The second device 106 can transfer an electronic coupon to the first device 102 for redemption at the targeted vendor. The user of the first device 102 can transfer the electronic coupon to the check-out register at the time of purchase of the goods or services of the advertised specials.

It has been discovered that the analyze available content module 230 of the communication system 100 of FIG. 1 can verify that the user of the first device 102 is a member of the category targeted by the auction of advertised specials in order to request inclusion in the distribution. The auction of the advertised specials can distribute a limited number of coupons for products or services to a very specific type of the categories 218. The auction of the advertised specials can reach the user of the first device 102 without regard to the location and still have a high confidence that the advertised specials will reach an audience that is highly likely to take advantage of the advertised specials. The transfer of an electronic coupon between the first device 102 and the check-out register of the vendor providing the advertised specials can provide positive feedback to the vendor and the communication system 100.

The analyze available content module 230 analyzes previous responses, as flagged by the effectiveness module 232, to the delivered content 238 that was delivered to the user of the first device 102 in order to determine whether additional location based services of the relevant information 236 will be effective. This can be determined if the user of the first device 102 actually went to the location related to the delivered content 238 for an appropriate length of time. The effectiveness module 232 can set-up the destination location indicated in the delivered content 238 and establish the expected duration of the visit in the cool-down window for detection by the clarify profile module 220.

For example, if the communication system 100 provides the delivered content 238 including a coupon for reduced price of dinner at a restaurant, detecting that the user of the first device 102 actually went to the restaurant location for more than a few minutes can indicate that the delivered content 238 was effective. If the visit to the restaurant only lasts a few minutes it would suggest that the user of the first device 102 was open to try the restaurant but didn't like something about the venue, such as an over-crowded space, no parking available, a long wait, or the wrong ambience. This would flag the delivered content 238, the coupon for reduced price of the dinner, was ineffective but a different restaurant coupon could be effective because the user of the first device 102 was willing to go to the suggested POI and that information would be added to the basis of the analysis of future events of the relevant information 236 available for the refined categories 226.

The analyze available content module 230 activates the effectiveness module 232 for alerting the clarify profile module 220 to assert a cool-down window for a variable period of time in order to assure the visit to a particular point of interest is not counted more than once. The variable period of time of the cool-down window is useful because visits to the different points of interest can involve a variable amount of time. For example visiting the coffee shop can take 5-15 minutes while the visit to a movie theatre can take 2-3 hours. The cool-down window can also be used in the verification of the effectiveness 222 of the delivered content 238.

By way of an example, if a user goes into a coffee shop and is active on the first device 102 while drinking their coffee in the shop (active means reading the news, playing a game, chatting with friends), there can be 2, 4, or even 10+ actions from that same user at the same location. In order to count only distinct visits, a cool-down window can be applied. For example, the user of the first device 102 can be detected at a POI at time "T", the visit to that POI is assumed to last until "T+D", where "T" is the arrival time and "D" is the expected duration of the visit which can vary by category. "D" is the cool-down window that can prevent erroneously counting a visit to the POI more than once.

With the coffee drinkers example, the expected duration "D" might be 60 minutes. So if the user of the first device 102 arrives at 8:00 am at a coffee shop, another visit will not be counted until after 9:00 am. Visits after 9:00 am are likely to be distinct visits and are counted separately. With mall shopping, the expected duration "D" might be up to 24 hours. If the user of the first device 102 is detected in a mall at 10 am, then again at 2 pm, it's likely to still be the same visit. The use of the cool-down window would only count mall trips 1×/day for the same POI location. A visit to a second mall at a different POI location would be counted as a separate trip even on the same day.

A deliver content module 234 triggers the delivery of the delivered content 238 at a specific date and time. There can also be opportunity transfers of the relevant information 236 that can be coordinated by the location of the user of the first device 102 and a buying opportunity that matches the interests and habits of the user of the first device 102.

The relevant information 236 can include impression advertising, auctioned advertising, coupons, event announcements and tickets, combination offers, location based opportunities, or the like. By parsing the relevant information 236 based on the refined categories 226, the delivered content 238 can be useful for the user of the first device 102 as well as the advertiser.

It has been discovered that the communication system 100 can increase the effectiveness 222 of the delivered content 238 provided to the user of the first device 102 by coordinating the timing of delivery and the content based on the refined categories 226 provided by the update categories module 224. The update categories module 224 can establish linkages and combinations of the relevant information 236 that can be appealing to the user of the first device 102, further increasing the effectiveness 222 of the delivered content 238.

It is understood that the communication system 100 can operate on the first device 102, the second device 106, or the combination thereof. The operation of the communication system 100 can provide the refined categories 226 that exemplify the interests and habits of the user of the first device 102 in order to allow distribution of the delivered content 238 to a pool of such devices through the auction of advertised specials. The first device 102 can access a pool of the relevant information 236 for transmitting the delivered content 238 to the user of the first device 102 based on a combination of the refined categories 226. Several instances of the first device 102 can receive the same offers in the delivered content 238 based on commonality of the interest and habits of the users.

Figure 3:
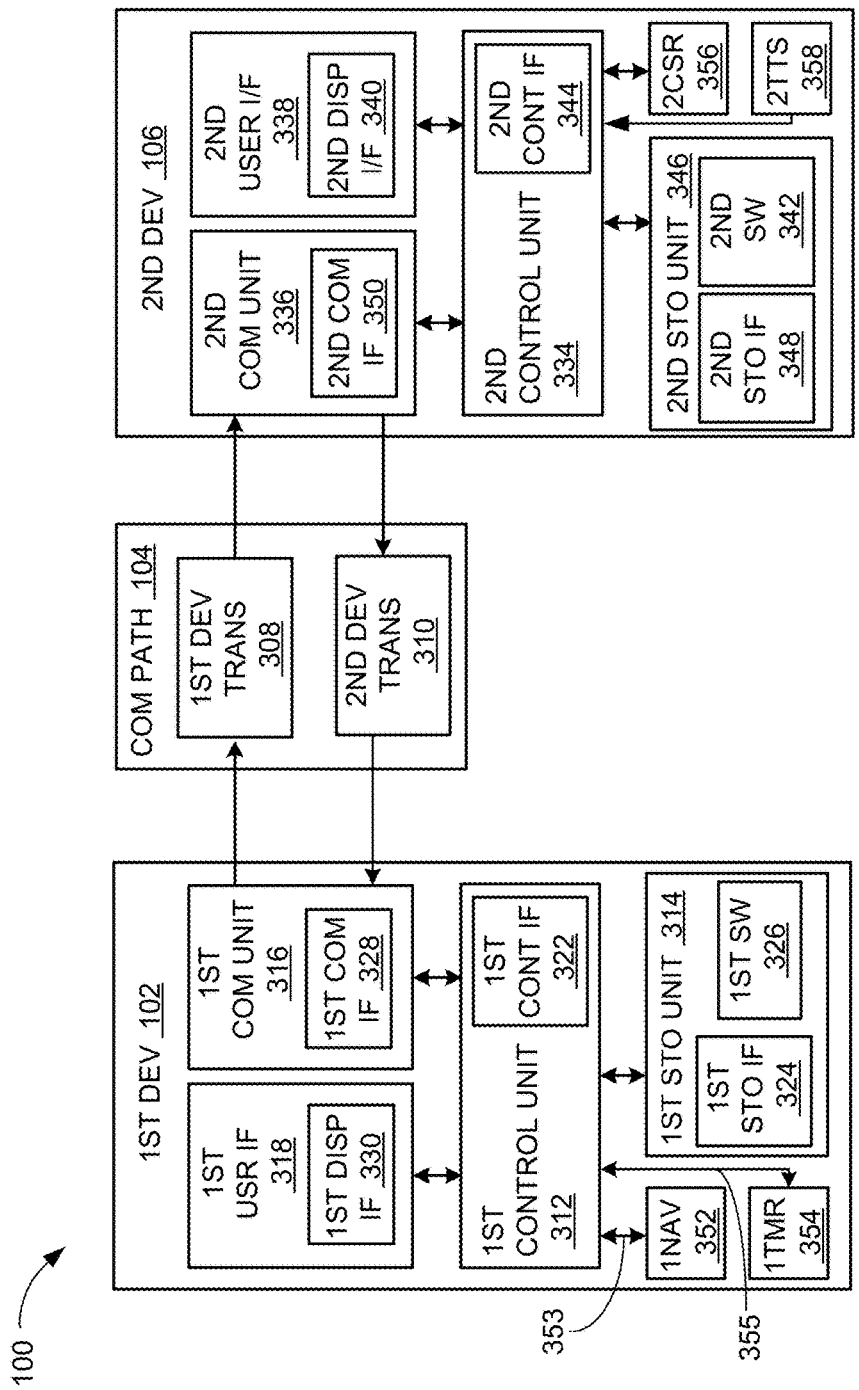
FIG. 3 is an example of a hardware block diagram of the communication system.

Referring now to FIG. 3, therein is shown an exemplary hardware block diagram of the communication system 100. The communication system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the communication system 100 is shown with the first device 102 as a client device, although it is understood that the communication system 100 can have the first device 102 as a different type of device. For example, the first device 102 can be a server having a display interface for displaying the relevant information.

Also for illustrative purposes, the communication system 100 is shown with the second device 106 as a server, although it is understood that the communication system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318. The first control unit 312 can include a first control interface 322. The first control unit 312 can execute a first software 326 to provide a portion of the intelligence of the communication system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, coupons, advertisements, sale notices, favorite functions, directions, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the communication system 100. The first control unit 312 can also execute the first software 326 for the other functions of the communication system 100. The first control unit 312 can further execute the first software 326 for interaction with the communication path 104 via the first communication unit 316.

The second device 106 can be optimized for implementing an embodiment of the present invention in a multiple device embodiment with the first device 102. The second device 106 can provide the additional or higher performance processing power compared to the first device 102. The second device 106 can converge relevant information for several of the first device 102 in order to provide groups of targeted users of the first device 102 that share common categories of the relevant information. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the communication system 100. The second software 342 can operate in conjunction with the first software 326 to execute the modules of the communication system 100. The second control unit 334 can provide additional performance compared to the first control unit 312.

The second control unit 334 can operate the second user interface 338 to display information. The second control unit 334 can also execute the second software 342 for the other functions of the communication system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the communication system 100 is shown with the second storage unit 346 as a single hierarchy storage system, although it is understood that the communication system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

A first navigation module 352 can determine a device location 353 of the first device 102 by communication with a global positioning satellite, cell tower triangulation, geofencing, WiFi access, public network access, home network access, personal area network access, or the like. The device location 353 can be passed to the first control unit 312 for analysis of the effectiveness 222 of FIG. 2 of the relevant information 236 of FIG. 2 delivered to the first device 102.

A first timer module 354 can be coupled to the first control unit 312. The first timer module 354 can be used to monitor durations of time between events of interest to the first control unit 312. The first timer module 354 can be scaled to measure time intervals from seconds to months and can be used in multiple processes concurrently. The first timer module 354 can measure the response time to access the delivered content 238 of FIG. 2 or it can be used to verify an extended period of time, such as days, weeks, or months, for evaluating the category threshold 228 of FIG. 2. The first timer module 354 can provide a time indicator 355, such as a time stamp or system clock for the first control unit 312 to associate with events of interest.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send the relevant information to the first device 102 in the second device transmission 310. The first device 102 can receive the relevant information in the first communication unit 316 from the second device transmission 310 of the communication path 104. The communication system 100 can be executed by the first control unit 312, the second control unit 334, dedicated hardware modules, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the communication system 100 is described by operation of the first device 102 and the second device 106. It is understood that the first device 102 and the second device 106 can operate any of the modules and functions of the communication system 100.

It has been discovered that the first device 102 can respond to the auction of the advertised specials through the communication path 104 for conveying the membership in the refined categories 226 of FIG. 2 in response to the relevant information 236 of FIG. 2, the delivered content 238 of FIG. 2, or a combination thereof. The first control unit 312 and the second control unit 334 can execute portions of the clarify profile module 220 of FIG. 2, update categories module 224 of FIG. 2, the analyze available content module 230 of FIG. 2, or a combination thereof to increase the effectiveness 222 of the delivered content 238.

Figure 4:
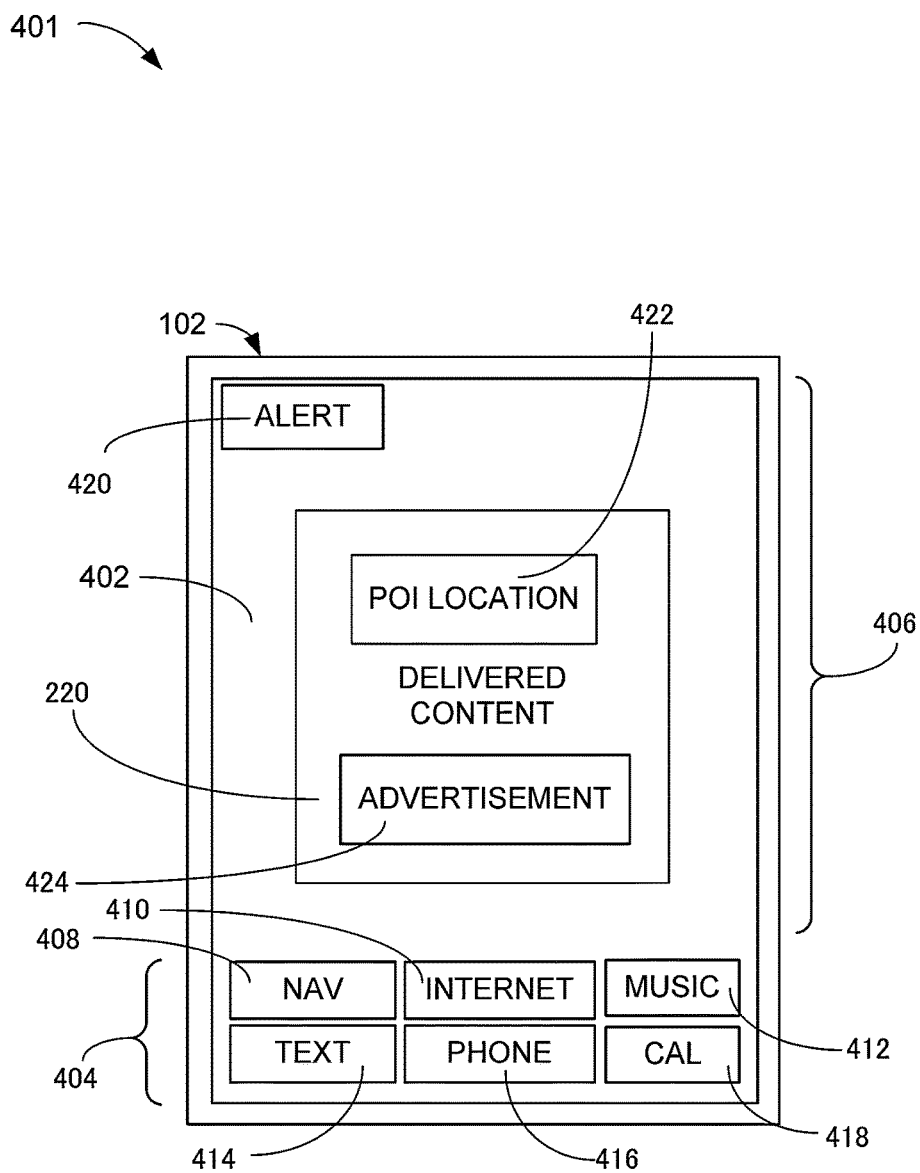
FIG. 4 is an example of an example of a display interface of the first device.

Referring now to FIG. 4, therein is shown an example of a display interface 401 of the first device 102. The example of the display interface 401 depicts a display screen 402 having an application area 404 and a working area 406.

The application area 404 can include a navigation tab 408, an Internet tab 410, a music tab 412, a text tab 414, a phone tab 416, a calendar tab 418, or a combination thereof. It is understood that the application area 404 can include other tabs (not shown). If any of the tabs in the application area 404 is accessed, the application will open in the working area 406.

An alert flag 420 can be displayed on the display screen to indicate that the first device 102 has the delivered content 238 for the user. By accessing the alert flag 420, the user can display the delivered content 238 in the working area 406. The delivered content 238 can include a point of interest location 422 and at least an advertisement 424. The point of interest location 422 can include links that can activate the navigation tab 408 for displaying directions to the location described in the point of interest location 422. Likewise, the advertisement 424 can include links that when activated can invoke the Internet tab 410 for accessing additional information about the point of interest described in the delivered content 238. The advertisement 424 can include sale information, discount coupons, alerts for upcoming events, pre-sale ticket alerts, or a combination thereof.

The delivered content 238 can be a location based advertisement or coupon, a user profile 210 of FIG. 2 based advertisement or coupon, an impulse advertisement or coupon, or a combination thereof. It is understood that the impulse advertisement or coupon can be reflective of the interests and habits of the user of the first device 102 as analyzed by the clarify profile module 220 of FIG. 2, update categories module 224 of FIG. 2, the analyze available content module 230 of FIG. 2, or the combination thereof.

It has been discovered that the communication system 100 of FIG. 1 can increase the effectiveness 222 of FIG. 2 of the delivered content 238 by extending the analysis of the user profile 210 to continuously evaluate the interests and habits of the user of the first device 102. By allowing the user of the first device 102 to access the alert flag 420 in order to display the delivered content 238 in the working area 406, the user can access the delivered content 238 at a convenient time. The first device 102 can maintain statistics on the duration between display of the alert flag 420 and access by the user of the first device 102. This monitoring can provide another indication of the effectiveness 222 of the delivered content 238. If the user of the first device 102 finds the delivered content 238 has been useful or interesting, the duration between display of the alert flag 420 and access by the user of the first device 102 will likely be shorter. If on the other hand the delivered content 238 is perceived as not being useful or interesting, the alert flag 420 can be ignored. If, however, the user of the first device 102 does travel to the location specified in the delivered content 238, without responding to the alert flag 420, the delivered content 238 can be viewed as being effective.

Figure 5:
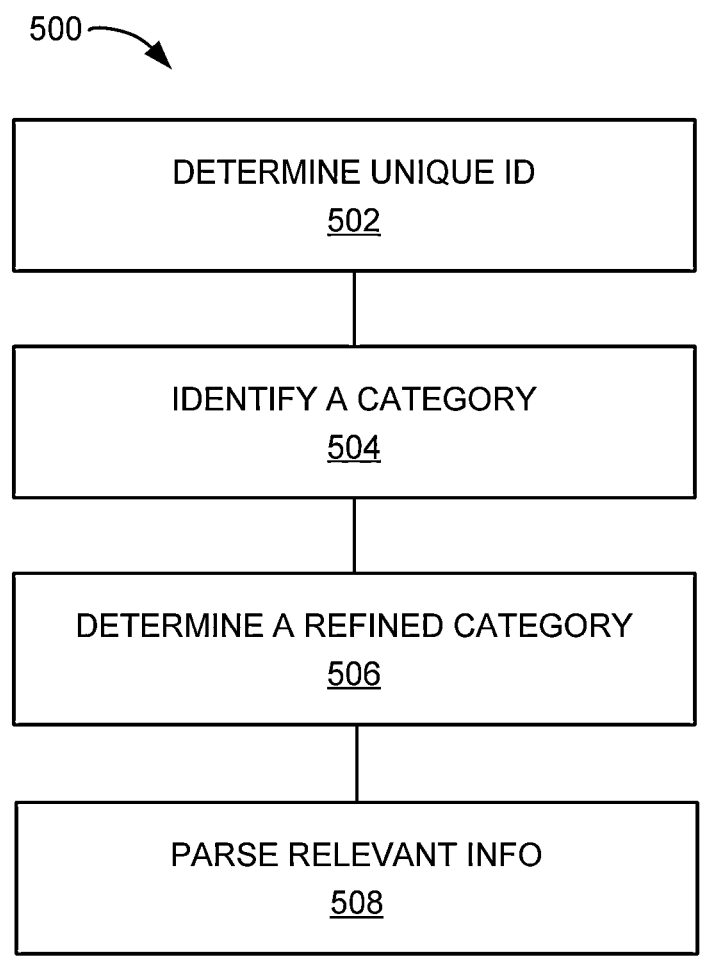
FIG. 5 is a flow chart of a method of operation of the communication system in a further embodiment of the present invention.

Referring now to FIG. 5, therein is shown a flow chart of a method 500 of operation of the communication system 100 in a further embodiment of the present invention. The method 500 includes: determining a unique identification in a block 502; identifying a category from the unique identification in a block 504; determining a refined category by analyzing an effectiveness of delivered content for the category in a block 506; and parsing a relevant information based on the refined category for presenting an alert flag on a device upon arrival of the delivered content in a block 508.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a communication system comprising:
    determining, with a control unit, a unique identification;
    identifying a category from the unique identification;
    determining a refined category by analyzing an effectiveness of a delivered content for the category including calculating a probability of acceptance of the delivered content;
    parsing a relevant information based on the refined category;
    presenting an alert flag on a device upon arrival of the delivered content; and
    displaying the delivered content when the alert flag is accessed on the device.

2. The method as claimed in claim 1 further comprising determining an entry into a device location of the relevant information for evaluating the effectiveness of the delivered content.

3. The method as claimed in claim 1 wherein analyzing the effectiveness of the delivered content includes comparing a point of interest location and a device location.

4. The method as claimed in claim 1 further comprising activating a navigation tab, in response to the alert flag, for determining a point of interest location in the delivered content.

5. The method as claimed in claim 1 further comprising activating an Internet tab, in response to the alert flag, by accessing an advertisement in the delivered content.

6. The method as claimed in claim 1 wherein determining the unique identification includes applying a one-way transform on a route history for removing personal information from the unique identification.

7. The method as claimed in claim 1 wherein determining the refined category includes combining two or more of the category for increasing the effectiveness of the delivered content.

8. The method as claimed in claim 1 wherein determining the refined category includes evaluating the route history for finding a device location visited by the device meeting or exceeding threshold rules.

9. The method as claimed in claim 1 further comprising monitoring a time indicator between asserting the alert flag and accessing the delivered content for evaluating the effectiveness of the delivered content.

10. The method as claimed in claim 1 wherein identifying the category includes identifying points of interest meeting or exceeding threshold rules for each type of the category.

11. A communication system comprising:
- a control unit for determining a unique identification;
- a storage unit, coupled to the control unit, for identifying a category from the unique identification;
- a communication interface, coupled to the control unit, for:
  - providing a delivered content,
  - determining a refined category by analyzing an effectiveness of the delivered content for the category including calculating a probability of acceptance of the delivered content,
  - presenting an alert flag on a device upon arrival of the delivered content, and
  - displaying the delivered content when the alert flag is accessed on the device.

12. The system as claimed in claim 11 wherein the control unit is for evaluating the effectiveness of the delivered content.

13. The system as claimed in claim 11 wherein the communication interface is for receiving the delivered content including a point of interest location and at least an advertisement received.

14. The system as claimed in claim 11 further comprising a user interface for accessing a navigation tab, on the display screen by selecting a point of interest location in the delivered content.

15. The system as claimed in claim 11 further comprising a user interface for accessing an Internet tab, on the display screen by selecting an advertisement in the delivered content.

16. The system as claimed in claim 11 wherein the control unit for determining the unique identification and for executing a one-way transform on a route history for removing personal information from the unique identification.

17. The system as claimed in claim 11 wherein the control unit configured to execute the update categories module for combining two or more of the refined category for increasing the effectiveness of the delivered content.

18. The system as claimed in claim 11 wherein the control unit configured for determining the refined category includes evaluating a route history for finding a device location visited by the device that meets or exceeds threshold rules.

19. The system as claimed in claim 11 further comprising a timer module, coupled to the control unit, for monitoring a time indicator between asserting the alert flag and accessing the delivered content on the device for evaluating an effectiveness of the delivered content.

20. The system as claimed in claim 11 further comprising a navigation module, coupled to the control unit, configured to execute an identify points of interest module by a device location identified meeting or exceeding threshold rules for each type of the category.

* * * * *